United States Patent Office 2,861,972
Patented Nov. 25, 1958

2,861,972
HIGH MOLECULAR WEIGHT CROSS-LINKED POLYESTER-URETHANE ELASTOMER PRODUCTS

Karl E. Müller and Otto Bayer, Leverkusen-Bayerwerk, and Siegfried Petersen, Leverkusen, Germany, assignors to Farbenfabriken Bayer Aktiengesellschaft, Leverkusen, Germany, a corporation of Germany No Drawing. Application June 2, 1954
Serial No. 434,062

Claims priority, application Germany June 3, 1953

8 Claims. (Cl. 260—45.4)

This invention relates to high molecular weight cross-linked products and to a process for their production.

In United States application Ser. No. 70,598 (now abandoned), filed January 12, 1949, by Erwin Müller, Hans-Frank Piepenbrink, Friedrich Wilhelm Schmidt and Erwin Weinbrenner, which is assigned to the same assignee as the present case, there is described a process for the production of high molecular weight cross-linked products by reacting isocyanate-modified polyesters with glycols such as butylene glycol, quinitol or diethylene glycol. In this process the chains of the isocyanate-modified polyester are increased in length by linking by urethane groups; further isocyanate groups then react with the hydrogen atoms of the newly formed urethane groups to give cross-linking in the molecule.

In accordance with the present invention it has been found that novel and valuable high molecular weight cross-linked products with rubber-like elastic properties can be obtained by reacting linear or substantially linear polyesters, derived substantially from aliphatic dicarboxylic acids and glycols, with diisocyanates and compounds which contain two hydroxyl groups linked by aliphatic groups, two aromatic ring systems, which may be condensed, and may further contain ester groups or functional groups reacting with isocyanates, for instance urea, urethane, carbamides or sulfonamide groups.

An example of the afore-said compounds containing two hydroxyl groups, which are referred to herein as "glycols," is the di-β-hydroxyethyl ether of 1,5-dihydroxynaphthalene. This ether can be obtained by conventional methods by reacting ethylene chlorhydrin with the sodium salt of 1,5-dihydroxynaphthalene, or by reacting two mols of ethylene oxide with 1,5-dihydroxynaphthalene in the presence of catalytic quantities of sodium, and corresponds to the following formula:

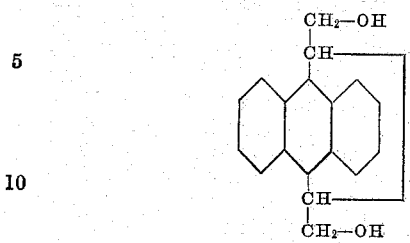

The isomers of the afore-said di-β-hydroxyethyl ether of 1,5-dihydroxynaphthalene are likewise "glycols" suitable for the process of the invention. Another useful compound is the product of the reaction between two mols of ethylene chlorohydrin and one mol of 4,4′-dihydroxydiphenyl-1,1′-cyclohexane; this product has the formula:

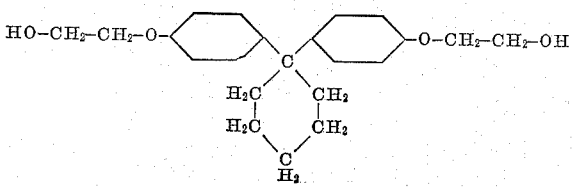

A further suitable glycol is the addition product, prepared from butene diol and anthracene, of the formula:

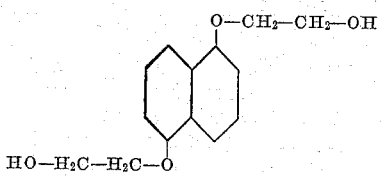

An example of a compound containing two hydroxyl groups linked by aliphatic groups, which further contains ester groups, suitable for the process of the invention is naphthalene-1,5-dicarboxylic acid-β-dihydroxyethyl ester. Glycols containing urea groups are obtainable for instance by reacting 1,5-naphthalene diisocyanate and hydroxyamines.

The process of the invention can be carried out by reacting the polyester, preferably after dehydrating, with a quantity of the organic diisocyanate in excess of the amount required to react with the end groups and reacting the resulting diisocyanate-modified polyester with the corresponding "glycol," which may previously be partly dissolved or suspended in the polyester. According to another embodiment of the invention the "glycol" is added before or after dehydration of the polyester and the reaction with the diisocyanate is carried out in a second stage.

According to still another embodiment, which is particularly useful if the reaction is to be carried out in temporarily separate steps, the polyester is reacted with a quantity of a diisocyanate smaller than that calculated on the end groups. The above-defined "glycols" are then added and the reaction is completed in a second step after adding further quantities of diisocyanate. Alternatively, the polyester is reacted with a quantity of the diisocyanate in excess of the amount required to react with the end groups, and the quantity of the glycol added is such that the glycol remains in excess over the isocyanate groups still present. After adding further quantities of diisocyanate the reaction is completed in a second stage.

An advantage of the new process over the previously known methods is that the cross-linking reaction proceeds at high velocity, so that the mixture can be removed from the molds within a short time; a further advantage is that the reaction is carried out in separate steps, which is of great importance for the molding process. Moreover, the cross-linking reaction carried out by means of the above-said glycols allows of producing high-quality polymeric products with excellent mechanical properties even with diisocyanates which, in the cross-linking reaction with normal glycols, yield products of only medium quality.

Diisocyanates especially suitable for use in the process of the invention are diphenylmethane diisocyanate, p-phenylenediisocyanate and 1,5 - naphthalene diisocyanate.

The linear polyesters which are employed as starting materials in the process of the invention are preferably prepared from substantially saturated, aliphatic products. Examples of suitable acids are adipic acid, succinic acid, sebacic acid and thiodipropionic acid. As glycols there may be employed ethylene glycol, butylene glycol or 1,2-propylene glycol. Small quantities of the other bifunctional reactants, as well as the compounds containing two hydroxyl groups linked by aliphatic groups and aromatic ring systems, may be used in the condensation. Care must be taken that, owing to a slight excess of glycols and to sufficiently long heating, the polyester has practically no acid value. The OH-value must be between about 20 and about 80, preferably between 40 and 60, That corresponds to a percentage of OH-groups of 0.6–2.4, preferably 1.2–1.8 by weight. The invention is further illustrated by the following examples:

Example 1

400 grams of diphenylmethane diisocyanate are added to 1.7 kilograms of a glycol adipic acid polyester (hydroxyl number 56) which had been dehydrated at 120–130° C. The temperature rises to 138° C. and, after about 15–20 minutes, a paste heated to 120° C. consisting of 300 grams of anhydrous 1,2-propylene glycol adipic acid polyester (hydroxyl number 49) and 110 grams of 1,5-naphthalene-di-β-hydroxy ethyl ether is added. The temperature rises to 150° C. As soon as the temperature drops, the melt is cast into molds and then heated to 100° C. The mixture can be removed from the molds after 15 minutes. The moldings are after-heated at 100° C. for 15 hours. They are highly elastic products of the following mechanical properties:

| | |
|---|---|
| Tensile strength _____ kg./cm.² __ | 250 |
| Elongation at break _____ percent __ | 620 |
| Permanent set _____ do ____ | 10 |
| Tear resistance _____ do ____ | 43 |
| Resilience _____ | 47/61 |
| Hardness _____ | 75 |
| Load at 300% elongation _____ | 52 |

Example 2

(a) 11 grams of 1,5 - naphthalene - di - β - hydroxy ethyl ether and 10 grams of finely divided silicon dioxide obtainable by oxidation of gaseous silicon halide of large surface area are added to 200 grams of a glycol adipic acid polyester (hydroxyl number 56) and dehydrated at 130° C. After this dehydration, 40 grams of diphenylmethane diisocyanate are added. The temperature rises to 148° C. As soon as the temperature drops the mass is cast into molds. After heating at 100° C. for 24 hours, a product of the following properties is obtained:

| | |
|---|---|
| Tensile strength _____ kg./cm.² __ | 277 |
| Elongation at break _____ percent __ | 740 |
| Permanent set _____ do ____ | 15 |
| Tear resistance _____ | 34.5 |
| Resilience _____ | 47/60 |
| Hardness _____ | 76 |
| Load at 300% elongation _____ | 68 |

(b) The same components in the following quantitative proportions are subjected to the above reaction conditions:

200 grams of glycol adipic acid polyester (hydroxyl number 56)
6 grams of 1,5-naphthalene-di-β-hydroxy ethyl ether
34 grams of diphenylmethane diisocyanate.

A material with the following properties is obtained:

| | |
|---|---|
| Tensile strength _____ kg./cm.² __ | 254 |
| Elongation at break _____ percent __ | 655 |
| Permanent set _____ do ____ | 18 |
| Tear resistance _____ | 36 |
| Resilience _____ | 53/61 |
| Hardness _____ | 69 |
| Load at 300% elongation _____ | 32 |

Example 3

6 grams of 1,5 - naphthalene - di - β - hydroxy ethyl ether are added to 200 grams of a glycol adipic acid polyester (hydroxyl number 56), the product is dehydrated at 130° C., and 25 grams of 4,4′-diphenylmethane diisocyanate are added at the said temperature. The melt is heated at 100° C. for 10 hours; the material is then made into a smooth sheet on a roll, which can be moulded to any desired shape at 130° C., after incorporating in the material 9 grams of diphenylmethane diisocyanate on a roll.

The properties of the material thus obtained correspond to those indicated in Example 2(b).

Example 4

34 grams of 1,5-naphthalene diisocyanate are added with stirring at 30° C. to 170 grams of a glycol adipic acid polyester (hydroxyl number 56) which had been dehydrated at 30° C. The temperature rises to 138° C. After the reaction has subsided a paste consisting of 30 grams of a glycol adipic acid polyester and 12.2 grams of diphenyl-4,4′-di-β-hydroxy ethyl ether are admixed with stirring. The melt is cast into molds and heated at 100° C. for 24 hours. The elastic product thus obtained shows the following properties:

| | |
|---|---|
| Tensile strength _____ kg./cm.² __ | 217 |
| Elongation at break _____ percent __ | 500 |
| Permanent set _____ do ____ | 7 |
| Tear resistance _____ | 42 |
| Resilience _____ | 40/64 |
| Hardness _____ | 78 |
| Load at 300% elongation _____ | 85 |

When the diphenyl-4,4′-di-β-hydroxy ethyl ether is replaced by 15.7 grams of 4,4′-dihydroxy-diphenyl-1,1′-cyclohexane-β-dihydroxy ethyl ether, a product with similar properties is obtained.

We claim:

1. In a process of forming a high molecular weight cross-linked product by reacting an organic diisocyanate and an aromatic glycol with an anhydrous organic linear polyester having from 0.6–2.4% by weight of hydroxyl groups and an acid value substantially not exceeding 1, said polyester being prepared substantially from a saturated aliphatic dicarboxylic acid and a glycol, the improvement comprising employing as the aromatic glycol to be reacted with said polyester a compound having two condensed aromatic rings and two aliphatically bonded —OH groups linked to the aromatic rings through alkylene groups, the latter being connected to the aromatic rings by a linkage selected from the group consisting of an ether linkage and a carboxylic ester linkage.

2. Process of claim 1 wherein the aromatic glycol is one having two condensed aromatic rings to which are attached two β-hydroxy ethyl ether groups.

3. Process of claim 2 wherein the aromatic glycol is one having two condensed aromatic rings to which are attached two β-hydroxy ethyl ester groups.

4. A process for the preparation of a high molecular weight cross-linked product which comprises mixing 1,5-naphthalene-di-β-hydroxyethyl ether and an anhydrous organic linear polyester having from 0.6–2.4% by weight of hydroxyl groups and an acid value substantially not exceeding 1, said polyester being prepared substantially from a saturated aliphatic dicarboxylic acid and a glycol, and then reacting this mixture with an organic diisocyanate.

5. A process for the production of a high molecular weight cross-linked product which comprises reacting an anhydrous organic linear polyester having from 0.6–2.4% by weight of hydroxyl groups and an acid value substantially not exceeding 1, said polyester being prepared substantially from a saturated aliphatic dicarboxylic acid and a glycol, with an organic diisocyanate in stoichiometric excess of the quantity required to react with the end groups of the polyester, and then reacting the isocyanate-modified polyester thus formed with a glycol having two condensed aromatic rings to which are attached two β-hydroxyethyl ether groups.

6. A process for the production of a high molecular weight cross-linked product which comprises reacting an anhydrous organic linear polyester having from 0.6–2.4% by weight of hydroxyl groups and an acid value substantially not exceeding 1, said polyester being prepared substantially from a saturated aliphatic dicarboxylic acid and a glycol, with an organic diisocyanate in a quantity insufficient to react with all the end groups of the polyester, and then reacting the resulting diisocyanate-modified polyester with further quantities of said diisocyanate and with a glycol having two condensed aromatic rings to which are attached two β-hydroxyethyl ether groups.

7. Process for the production of a high molecular weight cross-linked product which comprises reacting an anhydrous organic linear polyester having from 0.6–2.4% by weight of hydroxyl groups and an acid value substantially not exceeding 1, said polyester being prepared substantially from a saturated aliphatic dicarboxylic acid and a glycol, with an organic diisocyanate in stoichiometric excess of the quantity required to react with the end groups on the polyester, adding a glycol having two condensed aromatic rings to which are attached two β-hydroxyethyl ether radicals, the quantity of glycol being in excess of that required to react with the isocyanate groups present, and then adding further quantities of the diisocyanate and completing the reaction in a second stage.

8. A high molecular weight saturated organic isocyanate-modified polyester cross-linked with a glycol having two condensed aromatic rings to which are attached two β-hydroxyethyl ether groups, said polyester being an anhydrous organic linear polyester having from 0.6–2.4% by weight of hydroxyl groups and an acid value substantially not exceeding 1, said polyester being prepared substantially from a saturated aliphatic dicarboxylic acid and a glycol.

References Cited in the file of this patent

UNITED STATES PATENTS 2,729,618  Muller et al. _____ Jan. 3, 1956

FOREIGN PATENTS 581,146  Great Britain _____ Oct. 2, 1946

OTHER REFERENCES

Bayer: "Angewandte Chemie," 59, No. 9, pages 257–288, September 1947. (Copy in Scientific Library.)